United States Patent Office 3,321,986
Patented May 30, 1967

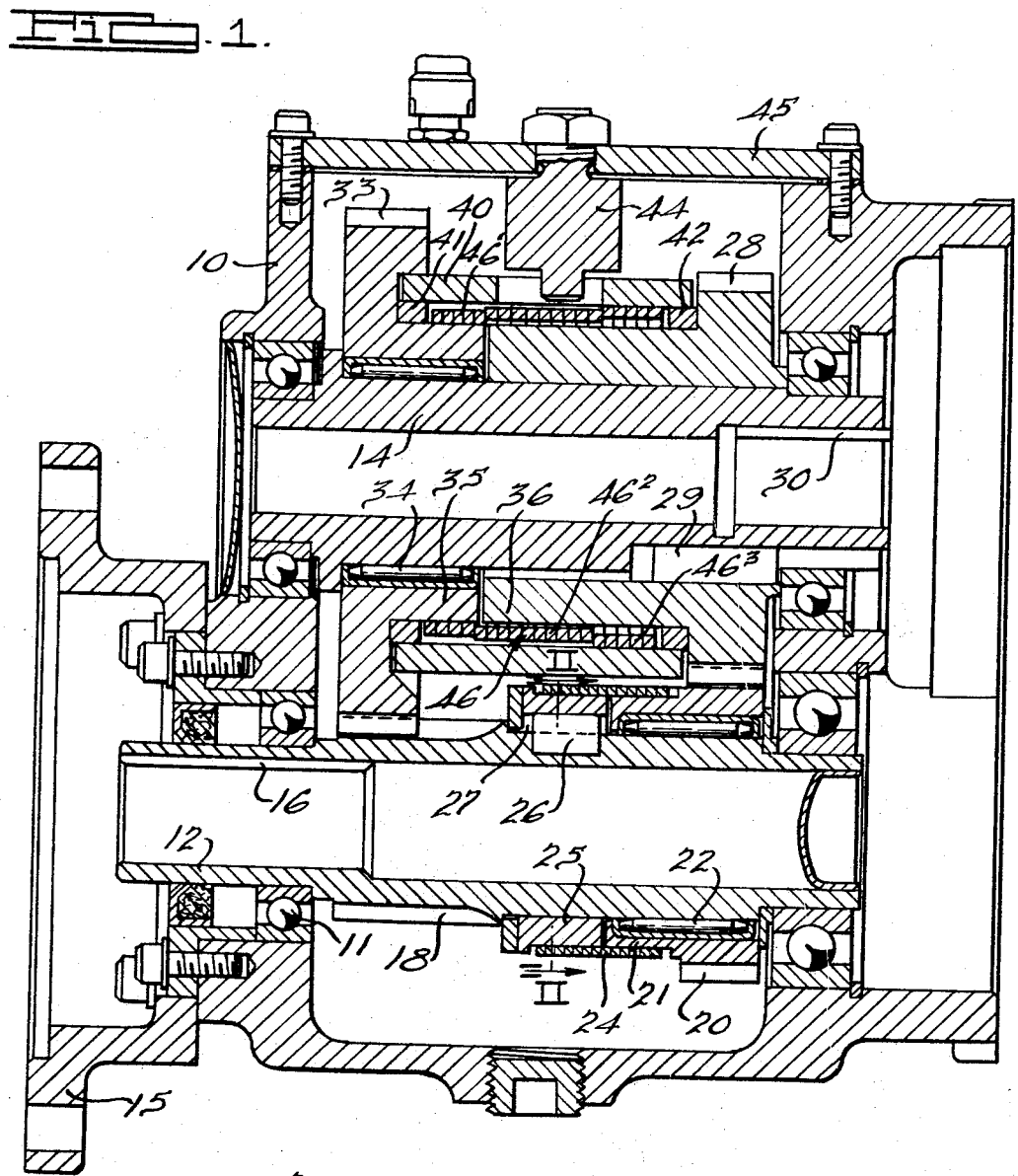
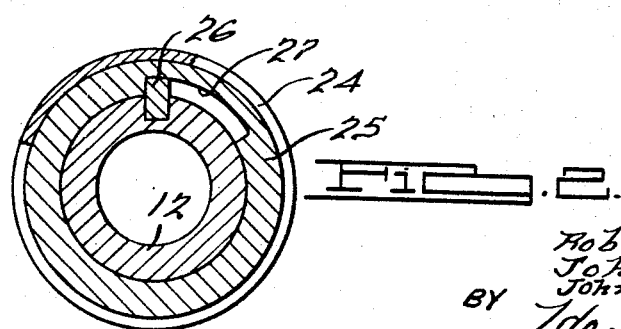

3,321,986
BI-DIRECTIONAL TRANSMISSION
Robert E. Chappell, John E. Nelson, and John R. Saltz, Lancaster, Ohio, assignors to Diamond Power Specialty Corporation, Lancaster, Ohio, a corporation of Ohio
Filed Sept. 18, 1964, Ser. No. 397,475
10 Claims. (Cl. 74—368)

The present invention relates to torque-converting power transmission means, having as its principal object the provision of an improved and simplified di-directional transmission adapted to transmit power at different torque ratios when operated in the forward and reverse directions and wherein the change in driving ratio is effected automatically in response to reversal of the direction of drive, without requiring either human manipulation or a special controlling agency.

A further object is to provide such a bi-directional multi-ratio transmission incorporating simple, reliable and highly positive means for safeguarding against lockup.

Other objects and advantages will become apparent upon consideration of the present disclosure in its entirety.

In the drawing:

FIGURE 1 illustrates in substantially central longitudinal vertical section a gear-type transmission incorporating the principles of the present invention; and FIGURE 2 is a sectional detail taken substantially on the line II—II of FIGURE 1 and looking in the direction of the arrows.

Referring now to the drawings:

The housing which constitutes the frame of the transmission is generally designated 10 and supports in suitable bearings, as 11, vertically spaced parallel input and output shafts 12, 14, respectively. The preferred transmission illustrated is arranged to be drivable by a reversible power source such as an electric motor (not shown) of a reversible type, supportable upon a flange 15 attached to the casing and arranged to drive the shaft 12 in either direction, the driving connection being effected through the internal splines 16 in the hollow shaft 12. A pinion 18 is fast upon shaft 12, and may be integral therewith as shown. Shaft 12 also supports a larger gear 20, journaled thereon upon needle bearings 22. Gear 20 is driveable by shaft 12 in one direction only, being connected to the shaft by an overrunning clutch of the coiled spring type. The spring 24 of the overruning clutch bridges and provides a one-way driving connection in the known manner between the abutting collinear cylindrical surfaces comprised by a hub portion 21 of gear 20 and adjacent cylindrical sleeve 25 carried by shaft 12. Clutch hub 25 is driveable by but limitedly clockable with respect to shaft 12 for a purpose which will be discussed hereinafter. The driving key 26 for hub 25 is fast in shaft 12 and projects into a key slot 27 in the internal wall of hub 25, slot 27 being 60° in peripheral length. The spring 24 is wrapped in a direction such that, due to its dragging fit upon both of the hubs 21, 25, it is frictionally contracted by wrapping action when the shaft 12 and hub section 25 are rotated counterclockwise (as view from the left) by the motor relative to hub 21 so that at such times gear 20 is effective to drive a gear 28 which is secured to output shaft 14 by key 29. The power output from shaft 14 is connectible as by the internal splines 30 to a device (not shown) to be driven. For convenience of reference, the just-described drive through the gears 20, 28 will be referred to as a forward drive, although this is of course purely arbitrary. In a typical application of this transmission, to the drive of the lance of a soot blower, the forward traverse is desirably more rapid than the reverse or retracting movement, and it will be seen that in the preferred transmission illustrated herein, the forward drive is more rapid than the reverse drive, due to the indicated size ratios of the gears. In many uses, however, as in the driving of carriages of machine tools, the higher speed output may be used for a forward or advancing feed or drive as will be appreciated.

Reverse driving gear 18 meshes with a gear 33 which is journalled on shaft 14 on needle bearings 34. Gear 33 has at one end an integral hub portion 35 the cylindrical external surface of which abuts and is collinear with the surface of a hub portion 36 integral with gear 28. Concentrically surrounding and outspaced from the hub portions 35, 36 is a cylindrical sleeve 40 positioned at its ends by collars 41, 42 mounted on the hub portions 35, 36, respectively. Sleeve 40 is keyed against rotation by a lock pin 44 rigidly carried by the cover portion 45 of the transmission housing. The internal diameter of the sleeve 40 exceeds the radial thickness of the one-way clutch spring 46 which bridges the hub portions 35, 36. When spring 46 is relaxed, its left end portion $46^1$ has a dragging friction fit on hub 35. At such time the intermediate portion $46^2$ which overlies hub 36 and which is somewhat greater in diameter than portion $46^1$ does not frictionally engage the hub 36, while the extreme right end portion $46^3$ which is slightly greater in diameter than section $46^2$ has a friction dragging fit upon the cylindrical internal surface of sleeve 40.

The direction of wrapping of spring 46 is such that when gear 33 is driven counterclockwise, in response to clockwise rotation of shaft 12, the frictional drag of the two spring ends $46^1$, $46^3$, is in a direction to wrap the spring, contracting it radially to cause its central portion $46^2$ to grip hubs 35, 36, counterclockwise rotation thereby being imparted to the output shaft 14 for reverse drive.

During the forward drive, gear 28 is driven in a clockwise direction more rapidly than gear 33. If the spring 46 were in engagement with hub 36, this would cause the one-way clutching effect of spring 46 to lock up the transmission by locking gear 28 to gear 33. It will be seen, however, that at such times, gear 33, being driven in a clockwise direction, keeps the central spring portion $46^2$ clear of hub 36 due to the expanding effect on spring 46 resulting from the engagement of part $46^3$ in sleeve 40, hub 35 then slipping in spring portion $46^1$. During reverse drive, clockwise rotation of shaft 12 and hub 25 releases the drive through spring 24, which accordingly slips, while the drive through gear 33 and hub 35 contracts the spring 46 to transmit a reverse drive through portions $46^1$, $46^2$ of spring 46, gear 28 and output shaft 14 as previously indicated, the drives through the two one-way clutches being opposite, due to their positioning.

The lost motion provided by the peripheral elongation of keyway 27 insures proper release of clutch spring 46. After the transmission has been driven in reverse and then stopped it may of course still be under load, and/or friction may tend to maintain firm gripping engagement between spring 46 and hub portions 35, 36, so that the reverse drive train is still effectively engaged. If the input is then reversed and power is applied to shaft 12 to rotate it forwardly, however, no drive will be imparted to gear 28 until, due to the lost motion at keyway 27, substantial rotation of gear 33 has occurred in a direction tending to unwind and release the spring 46. Release of spring 46 is thus insured before torque can be transmitted through the forward train. This arrangement effectively prevents unwanted lockup which might result from simultaneous engagement of both clutch springs.

While it will be apparent that the preferred embodimnt of the invention disclosed is well calculated to fulfill the objects above stated, it will be appreciated that the invention is susceptible to modification, variation and change without departing from the proper scope or fair meaning of the subjoined claims.

What is claimed is:

1. A transmission including a frame, input and output shafts rotatable in the frame, a first drive train interconnecting said shafts, a second drive train interconnecting said shafts at a different torque ratio, and a pair of oppositely acting one-way driving means, one incorporated in each drive train, at least one of said drive trains including a driving element and a drivable element, the one-way driving means in said last-mentioned train including a torque transmitting element automatically engageable and disengageable in response to changes in the absolute direction of rotation relative to the frame and independently of the direction of torque transmission.

2. A transmission including a frame, input and output shafts rotatable in the frame, a first drive train interconnecting said shafts, a second drive train interconnecting said shafts at a different torque ratio, and a pair of oppositely acting one-way driving means, one incorporated in each drive train, one of said one-way driving means being engageable and disengageable in response to changes in the absolute direction of rotation relative to the frame and independently of the direction of torque transmission, and lost motion means in the drive train which incorporates the other of said one-way driving means.

3. A transmission including a frame, spaced parallel input and output shafts rotatable in the frame, a first drive train comprising torque transmitting members carried by said shafts in one plane for drivingly interconnecting the shafts at a predetermined ratio, a second drive train comprising additional torque transmitting members carried by said shafts in a plane spaced from the first mentioned plane for drivingly interconnecting the shafts at a second ratio, overrunning clutching means incorporated in one of said trains and engageable and disengageable in response to torque reversals through said train, and second overrunning clutching means carried by one of said shafts between said planes and incorporated in the other train and engageable and disengageable in response to reversals in direction of relative rotation between a member of said other train and the frame.

4. In a transmission as defined in claim 3, lost motion means in the drive train which incorporates the clutching means responsive to torque reversals.

5. A transmission as defined in claim 1 including an overrunning clutch of the wrapping spring type forming said one-way driving means which is responsive to changes in direction of rotation, said clutch comprising a coil spring which when in normally relaxed declutched condition has one end frictionally engaged with a member of its train, the other end frictionlly engaged with a part held against unwanted rotation with respect to the frame, and an intermediate part wrappable and unwrappable to initiate and interrupt a driving connection with a member connected to drive the output shaft.

6. A transmission as defined in claim 1 including an overrunning clutch of the wrapping spring type forming said one-way driving means which is responsive to changes in direction of rotation, said clutch comprisng a coil spring which when in normally relaxed declutched condition has one end frictionally engaged with a member of its train, the other end frictionally engaged with a part held against unwanted rotation with respect to the frame, an intermediate part wrappable and unwrappable to initiate and interrupt a driving connection with a member connected to drive the output shaft, and lost motion means in the drive train which incorporates the clutching means responsive to torque reversals.

7. A transmission comprising a driving member, a driveable member, two sets of torque transmitting agencies forming drive trains for drivingly interconnecting said members in different torque ratios, two one-way driving mechanisms, one such mechanism being operatively incorporated in the drive train through each agency, each of said mechanisms being operatively engageable and disengageable and the two mechanisms being effective to transmit drives to the driveable member in opposite directions only, one of said mechanisms being engageable in response to rotation of the driving member in one direction, and the other mechanism being engageable in response to rotation of the driving member in the opposite direction, one of said mechanisms being engageable and disengageable in response to torque reversal through its drive train, and the other of said mechanisms being engageable and disengageable in response to changes in the direction of rotation of the driving member.

8. A transmisison comprising a driving member, a driveable member, two sets of torque transmitting agencies forming drive trains for drivingly interconnecting said members in different torque ratios, two one-way driving mechanisms, one such mechanism being operatively incorporated in the drive train through each agency, each of said mechanisms being operatively engageable and disengageable and the two mechanisms being effective to transmit drives to the driveable member in opposite directions only, one of said mechanisms being engageable in response to rotation of the driving member in one direction, and the other mechanism being engageable in response to rotation of the driving member in the opposite direction, one of said mechanisms being engageable and disengageable in response to torque reversal through its drive train, and the other of said mechanisms being engageable and disengageable in response to changes in the direction of rotation of the driving member, and means providing lost motion between the one-way driving mechanism and the driving member in one of said drive trains.

9. A transmission as defined in claim 8 wherein said mechanisms comprise spring-type overrunning clutches, said lost motion means being in the drive train containing said mechanism responsive to torque reversals, a frame structure supporting said transmission, and means reacting on the frame structure for engaging and disengaging the other of said mechanisms.

10. A transmission as defined in claim 1 wherein the speed ratio of the train through the one-way driving means responsive to direction independently of torque is greater than the speed ratio through the other one-way driving means.

References Cited
UNITED STATES PATENTS

| | | | |
|---|---|---|---|
| 3,026,739 | 3/1962 | Hungerford et al. | 74—368 |
| 3,090,247 | 5/1963 | Hood et al. | 74—368 |
| 3,168,837 | 2/1965 | Greenwald | 74—368 |

DONLEY J. STOCKING, *Primary Examiner.*

DAVID J. WILLIAMOWSKY, *Examiner.*

H. S. LAYTON, *Assistant Examiner.*